United States Patent
Stenlåås

(10) Patent No.: US 9,333,462 B2
(45) Date of Patent: May 10, 2016

(54) EXHAUST AFTERTREATMENT SYSTEM AND METHOD PERTAINING TO SUCH A SYSTEM

(71) Applicant: SCANIA CV AB, Södertälje (SE)

(72) Inventor: Ola Stenlåås, Södertälje (SE)

(73) Assignee: SCANIA CV AB (SE)

(*) Notice: Subject to any disclaimer, the term of this patent is extended or adjusted under 35 U.S.C. 154(b) by 0 days.

(21) Appl. No.: 14/396,157

(22) PCT Filed: May 2, 2013

(86) PCT No.: PCT/SE2013/050482
§ 371 (c)(1),
(2) Date: Oct. 22, 2014

(87) PCT Pub. No.: WO2013/165309
PCT Pub. Date: Nov. 7, 2013

(65) Prior Publication Data
US 2015/0093311 A1    Apr. 2, 2015

(30) Foreign Application Priority Data

May 3, 2012   (SE) .................... 1250439-5
May 2, 2013   (SE) .................... 1350535-9

(51) Int. Cl.
*B01D 53/94* (2006.01)
*F01N 3/18* (2006.01)
(Continued)

(52) U.S. Cl.
CPC ........ *B01D 53/9495* (2013.01); *B01D 53/9477* (2013.01); *F01N 3/208* (2013.01);
(Continued)

(58) Field of Classification Search
CPC ....... F01N 9/00; F01N 3/208; F01N 2570/18; F01N 261/146; F01N 2570/145; Y02T 10/24; B01D 53/9477; B01D 53/9445; B01D 2251/2062; B01D 2251/2067; B01D 2251/208; Y02C 20/10
See application file for complete search history.

(56) References Cited

U.S. PATENT DOCUMENTS 5,270,025 A    12/1993   Ho et al.
5,547,650 A    8/1996    Edgar et al.
(Continued)

FOREIGN PATENT DOCUMENTS

DE    10 2009 042 087 A1    6/2010
DE    10 2010 055 642 A1    5/2012
(Continued)

OTHER PUBLICATIONS

International Search Report dated Aug. 30, 2013 issued in corresponding International patent application No. PCT/SE2013/050482.

*Primary Examiner* — Timothy Vanoy
(74) *Attorney, Agent, or Firm* — Ostrolenk Faber LLP

(57) ABSTRACT

An exhaust gas aftertreatment system and a method of use reduces the amount of $N_2O$ produced in at least one of: (1) a selective catalytic reduction (SCR) catalytic converter and (2) an ammonia slip catalyst (ASC) in the exhaust gases from a combustion engine. The system includes an SCR catalytic converter arranged in an exhaust gas line upstream of an optional ASC. The exhaust gases pass through the SCR catalytic converter and any ASC before they are released by the exhaust gas outlet. An injector injects a reducing agent into the exhaust gases in the exhaust gas line upstream of the SCR catalytic converter at a dosing frequency F. A control unit generates a control signal to adjust the dosing frequency F so that the amount of $N_2O$ produced in at least one of: (1) the SCR catalytic converter and (2) the ASC is minimized while maintaining the amount of reducing agent added.

22 Claims, 2 Drawing Sheets

(51) Int. Cl.
 *F01N 9/00* (2006.01)
 *F01N 3/20* (2006.01)

(52) U.S. Cl.
 CPC ........... *F01N 9/00* (2013.01); *B01D 2251/208* (2013.01); *B01D 2251/2062* (2013.01); *B01D 2251/2067* (2013.01); *F01N 2560/06* (2013.01); *F01N 2570/145* (2013.01); *F01N 2570/18* (2013.01); *F01N 2610/146* (2013.01); *F01N 2900/1404* (2013.01); *Y02C 20/10* (2013.01); *Y02T 10/24* (2013.01); *Y02T 10/47* (2013.01)

(56) References Cited

U.S. PATENT DOCUMENTS

| | | | | |
|---|---|---|---|---|
| 8,865,615 | B2 * | 10/2014 | Ito | B01J 35/04 502/262 |
| 2009/0324453 | A1 | 12/2009 | Harinath et al. | |
| 2010/0281853 | A1 * | 11/2010 | Toshioka | B01D 53/30 60/276 |
| 2010/0303699 | A1 * | 12/2010 | Sasaki | B01D 53/8625 423/239.2 |
| 2014/0044635 | A1 * | 2/2014 | Ito | B01D 53/9436 423/239.1 |
| 2015/0113966 | A1 * | 4/2015 | Kamasamudram | B01D 53/9431 60/301 |
| 2015/0265969 | A1 * | 9/2015 | Fedeyko | B01D 53/9418 423/213.2 |

FOREIGN PATENT DOCUMENTS

| | | | | |
|---|---|---|---|---|
| EP | 2 143 901 A1 | 1/2010 | | |
| JP | 2010 071255 A | * | 4/2010 | ................ F01N 3/36 |
| WO | WO 2012/021103 A1 | 2/2012 | | |

* cited by examiner

EXHAUST AFTERTREATMENT SYSTEM AND METHOD PERTAINING TO SUCH A SYSTEM

CROSS-REFERENCE TO RELATED APPLICATIONS

The present application is a 35 U.S.C. §§371 National Phase conversion of PCT/SE2013/050482, filed May 2, 2013, which claims priority of Swedish Patent Application No. 1250439-5, filed May 3, 2012, the contents of which are incorporated by reference herein and Swedish Patent Application No. 1350535-9, filed May 2, 2013, the contents of which are incorporated by reference herein. The PCT International Application was published in the English language.

TECHNICAL FIELD OF THE INVENTION

The present invention concerns an exhaust gas aftertreatment system and a method in connection with such a system, configured and adapted to reduce emissions of nitrous oxide, $N_2O$.

BACKGROUND OF THE INVENTION

A combustion engine burns an air and fuel mixture to generate a driving torque. The combustion process generates exhaust gases that are released from the engine into the atmosphere. The exhaust gases contain, among other things, nitrous oxides ($NO_X$), carbon dioxide ($CO_2$), carbon monoxide (CO) and particles. $NO_X$ is a collective term used to describe the exhaust gases that consist primary of nitrous oxide (NO) and nitrogen dioxide ($NO_2$). An exhaust gas aftertreatment system processes the exhaust emissions in order to reduce the emissions before they are released into the atmosphere. In one exemplary exhaust gas aftertreatment system, a dosing system injects a reducing agent into the exhaust gases upstream of a selective catalytic reduction catalytic converter (SCR catalytic converter). The exhaust gas and reducing agent mixture react in the SCR catalytic converter, thereby reducing the amounts of $NO_X$ that are released into the atmosphere.

One example of a reducing agent is liquid urea, which is commercially available as AdBlue®. This fluid is a non-toxic aqueous urea solution that is used to chemically reduce emissions of nitrous oxides, particularly in heavy diesel-powered vehicles.

The reducing agent reacts with $NO_X$ in the SCR catalytic converter to achieve the $NO_X$ reduction. More specifically, the reducing agent is broken down and forms ammonia ($NH_3$), which in turn reacts with $NO_X$ to form water and nitrogen ($N_2$).

To achieve the described $NO_X$ reduction, $NH_3$ must be stored in the SCR catalytic converter. For the SCR catalytic converter to be able to work efficiently, the stored level must be at an adequate level. In further detail, the $NO_X$ reduction, or the conversion efficiency, is dependent upon the stored level. The store of $NH_3$ must be maintained in order to maintain high conversion efficiency under various operating conditions. However, as the temperature in the SCR catalytic converter rises, the $NH_3$ level must be reduced accordingly to prevent the release of $NH_3$ (i.e. a surplus of $NH_3$ being released from the SCR catalytic converter), which can lower the conversion efficiency of the catalyst.

In summary, to satisfy more stringent environmental requirements, more and more vehicle manufacturers are using SCR catalytic converter systems to cleanse diesel exhaust gases of nitrous oxides ($NO_X$). This is done by injecting ammonia solution into an SCR catalytic converter, which helps to convert $NO_X$ particles into nitrogen and water. The exhaust gas purification strategy should take into account that a sufficient amount of $NO_X$ must be converted while avoiding injecting too much ammonia, in view of both fuel economy and environmental considerations.

At least one diesel oxidation catalyst (DOC) is also used in exhaust gas aftertreatment systems, and one or a plurality of diesel particle filters (DPF) are also often coated with a catalytic coating. The purpose of this is in part to generate a sufficient amount of $NO_2$ to achieve passive oxidation of soot that is captured by a DPF. This occurs according to the reaction: $C+2NO_2 \rightarrow CO_2+2NO$ In those cases where not all the ammonia has been consumed for the desired reduction in the SCR catalytic converter, it can be stored in the SCR catalytic converter, entrained in the exhaust gases from the SCR catalytic converter or reacted in the SCR catalytic converter to form $N_2O$. To avoid undesirable ammonia emissions, a so-called Ammonia Slip Catalyst, hereinafter ASC catalyst, is used downstream of the SCR catalytic converter to process any residual ammonia.

The function of the ASC catalyst depends in part on the temperature of the exhaust gases in such a way that if ammonia is oxidized in the ASC catalyst under conditions where the temperature in the ASC is high and the mixture is favorable, mainly $NO_X$ will be produced. On the other hand, if ammonia is oxidized under conditions where the conditions in the ASC are less favorable, $N_2O$ (nitrous oxide) will be produced instead. The ability of the SCR catalytic converter to store ammonia decreases with increasing temperature, with the result that ammonia will then preferably either leave the SCR catalytic converter or transition into $N_2O$. As a result, an ASC catalyst normally acquires high levels of ammonia only at high temperatures. $N_2O$ emissions will thus depend on the temperature in both the SCR catalytic converter and the ASC catalyst. In the case where conditions are less favorable, the amount of ammonia and $NO_X$ will decrease downstream of the ASC catalyst, while $N_2O$ will be released. Because $N_2O$ is a gas that is a very powerful greenhouse gas, ca. 300 times stronger than carbon dioxide, it is desirable to reduce the emissions of $N_2O$ into the atmosphere.

Published patent application EP-2143901 describes a method intended to estimate the amount of $N_2O$ produced in vehicle exhaust gases. This is achieved in part by sensing the $NO_X$ concentrations upstream and downstream of the SCR catalytic converter. By then regulating the urea dosing based on these estimates, it is possible to thereby reduce the formation of nitrous oxide in the exhaust gas purification process.

U.S. Pat. No. 5,270,025 concerns a method for reducing nitrous oxide emissions while simultaneously reducing $NO_X$. A combination of urea and an additional substance, such as glutamate, is used to regulate the emissions.

U.S. Pat. No. 5,547,650 describes an exhaust gas purification system in which N2O is removed by heating the exhaust gases and, finally, US-2009/0324453 describes a catalyst for $NO_X$ purification of exhaust gases by means of urea dosing.

A need thus exists to reduce emissions of nitrous oxide, and the object of the present invention is to achieve an improved exhaust gas aftertreatment system in which the emissions of $N_2O$ are reduced or avoided entirely.

SUMMARY OF THE INVENTION

The aforesaid object is achieved by the invention disclosed herein.

The invention generally concerns a method for reducing nitrous oxide emissions, and more specifically a method for an exhaust gas aftertreatment system configured to reduce the amount of $N_2O$ that is produced in a selective catalytic reduction catalytic converter (SCR catalytic converter) and/or in an ammonia slip catalyst (ASC catalyst) disposed in the exhaust gas flow from a combustion engine, wherein the exhaust gas aftertreatment system comprises an SCR catalytic converter disposed upstream of an optional ASC catalyst, whereupon a reducing agent is added to the exhaust gas flow upstream of the SCR catalytic converter at a dosing frequency F. According to the method, the dosing frequency F is adjusted so as to minimize the amount of $N_2O$ that is produced in the SCR catalytic converter and/or ASC catalyst while maintaining the amount of reducing agent added.

According to one embodiment, the dosing frequency is adjusted so that it is increased when the exhaust gas temperature upstream of the SCR catalytic converter and/or ASC catalyst is higher than a predetermined threshold value. For example, the increase in the dosing frequency entails a doubling of the frequency compared with when the temperature is below said threshold value.

The invention also comprises an exhaust gas aftertreatment system in which the aforesaid method is implemented.

The reducing agent is added pulse-wise, with current dosing frequencies normally falling within the range of 0.1-10 Hz.

The invention is based on the inventor's insight that, by adding the reducing agent at a higher frequency compared with that currently used, the variations of the reducing agent in the exhausts gases that react in and emerge from the SCR catalytic converter are reduced, which is advantageous in terms of reducing the amount of $N_2O$ that is produced in the SCR catalytic converter or in the subsequent ASC catalyst. According to the invention, the dosing frequency must be equal to or higher than 2 Hz, while maintaining the total dosed amount of reducing agent, compared with a conventionally set dosing frequency.

By controlling the dosing of the reducing agent, it is possible in some cases to regulate the formation of nitrous oxide and thereby reduce it. Existing hardware for supplying reducing agent can be used without necessitating changes in the SCR catalytic converter/ASC catalyst, which is advantageous, as the costs of implementing the invention in existing systems will be low.

DETAILED DESCRIPTION OF PREFERRED EMBODIMENTS OF THE INVENTION

The invention will now be described in detail with reference to the accompanying figures.

Figure 1:
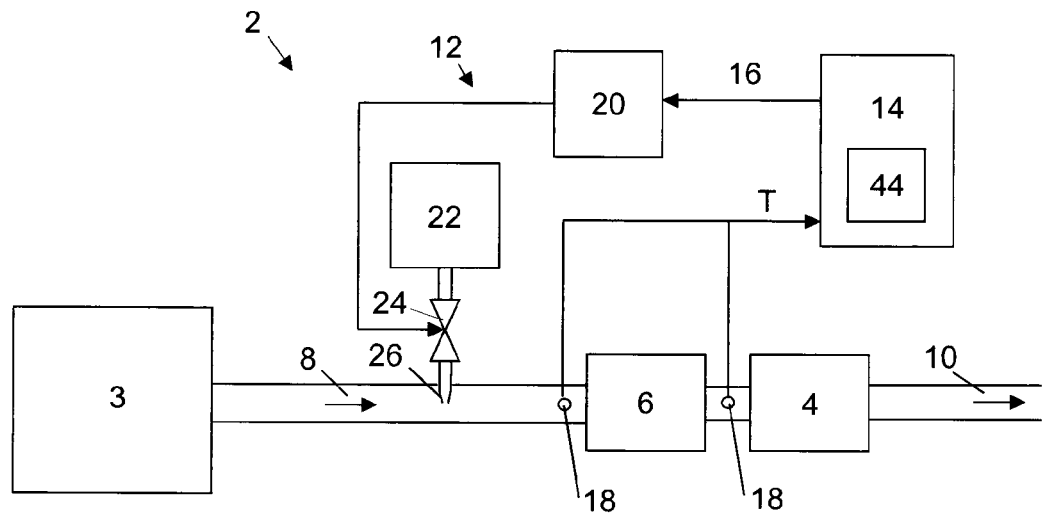
FIG. 1 is a block diagram that schematically illustrates one embodiment of the present invention.

FIG. 1 shows a block diagram that illustrates one embodiment of the invention.

The invention concerns an exhaust gas aftertreatment system 2 configured to minimize the amount of $N_2O$ that is produced in a selective catalytic reduction catalytic converter (SCR catalytic converter) 6 and/or in an ammonia slip catalyst (ASC catalyst) 4 disposed in the exhaust gas flow from a combustion engine 3. The ASC catalyst is intended to oxidize ammonia in the exhaust gas flow in order to thereby reduce the release of ammonia.

The exhaust gas aftertreatment system comprises an SCR catalytic converter 6 arranged in an exhaust gas line 8 upstream of an optional ASC catalyst 4, and the exhaust gases from the combustion engine 3 thus pass through the SCR catalytic converter 6 and any ASC catalyst 4 before being released into the surrounding via the exhaust gas outlet 10. The exhaust gas aftertreatment system further comprises an injection device 12 configured to inject a reducing agent into the exhaust gases in the exhaust gas line 8 upstream of the SCR catalytic converter 6 at a dosing frequency F.

The reducing agent, e.g. urea, is thus injected by means of an injection device 12 into the exhaust gases in the exhaust gas line 8 upstream of the SCR catalytic converter 6. The injection device 12 comprises one or a plurality of injection elements 26 in the form of injection nozzles or the like that are arranged in the exhaust gas line 8, and a storage container 22 for reducing agent connected thereto. The injection device 12 also comprises a control element 20 connected to a regulating element 24. The regulating element 24 is controlled by the control element 20, which determines how large an amount of reducing agent is to be injected into the exhaust gases based on the prevailing operating conditions of the combustion engine 3 and the catalytic converter 6, and in dependence upon a control signal 16 from a control unit 14.

The reducing agent can, for example, be urea ($CO(NH_2)_2$), ammonia ($NH_3$) or a hydrocarbon (fuel). The reducing agent is added by the injection device 12 by injecting the reducing agent at a dosing frequency F, with a dosing period time L (L=1/F), which is defined as the time between the starts of two consecutive injections, with the injection occurring during an adjustable dosing time t of said dosing period time, where 0<t<L. The amount of reducing agent injected is varied by varying the dosing frequency F and/or the dosing time t for the injection of the reducing agent.

It is further possible to vary the amount of reducing agent added by changing the dosing pressure, i.e. the pressure being applied to the reducing agent during injection. This can occur in combination with a variation of the dosing frequency F and/or the dosing time t.

According to the invention, the exhaust gas aftertreatment system 2 comprises a control unit 14 configured to generate a control signal 16 intended to adjust the dosing frequency F so that the amount of $N_2O$ that is produced in the SCR catalytic converter and/or in the ASC catalyst is minimized while maintaining the amount of reducing agent added.

According to one embodiment, the dosing frequency F is adjusted so that the variation in the amount/content of reducing agent upstream of the SCR catalytic converter is lower than a predetermined threshold value ΔR, where ΔR is +/−5%.

For example, the dosing frequency F is adjusted so that the variation in the amount/content of reducing agent upstream of the SCR catalytic converter is lower than a predetermined threshold value ΔR, where ΔR is +/−1%.

According to an additional embodiment, the dosing frequency F is adjusted so that the variation in the amount/content of reducing agent upstream of the ASC catalyst is lower than a predetermined threshold value ΔR, where ΔR is +/−5%.

The variation in the amount/content of reducing agent can, for example, be modeled by means of folder(s)/table(s) or a suitable formula, based on one or a plurality of the:
dosing frequency;
total injected reducing agent flow;
share of time during which reduction dosing occurs (e.g. expressed as a percentage (%) of the time between two incipient dosings);
exhaust gas flow (e.g. kg exhaust gas per minute);
exhaust gas temperature In certain operating cases and with certain sensor placements, NOx and NH3 sensors can emit signals that oscillate at the same frequency as the dosing, and the amplitude of one or a plurality of such signals can then be incorporated in the model as well, either separately or in combination with one or a plurality of the foregoing parameters.

The variation in the amount/content of reducing agent upstream of the SCR catalytic converter and/or ASC catalyst can thus be determined in one of a plurality of suitable ways. On this basis, the dosing frequency F can be determined/adjusted so that the resulting variation in the amount/content of reducing agent upstream of the SCR catalytic converter and/or ASC catalyst will be lower than a predetermined threshold value $\Delta R$.

Figure 2:
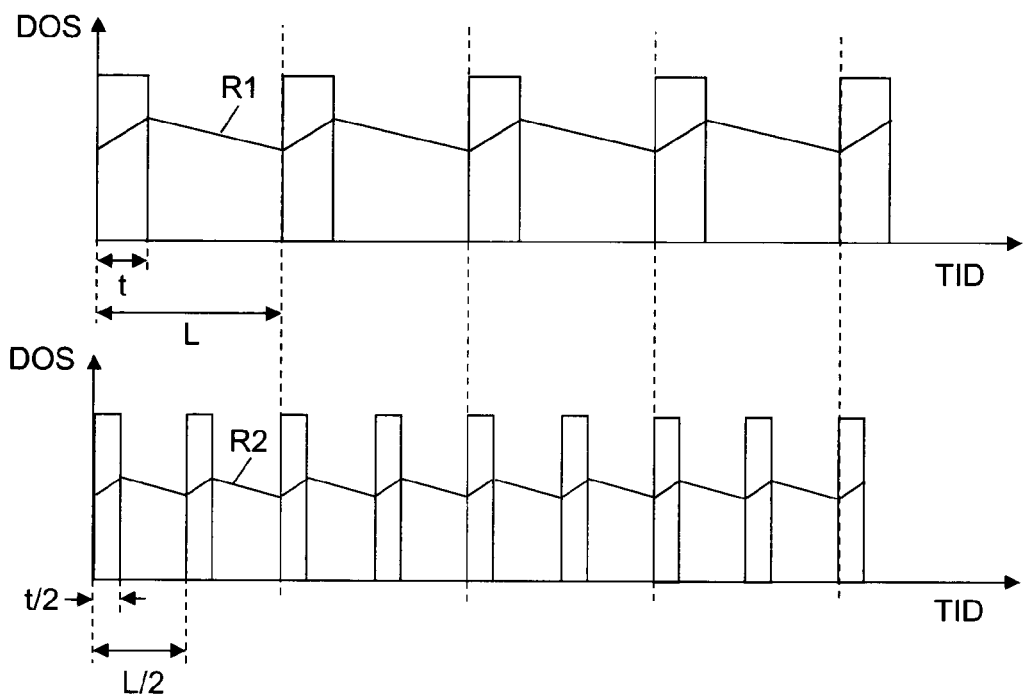
FIG. 2 shows an upper graph and a lower graph to illustrate the present invention.

The adjustment of the dosing frequency F preferably entails that the dosing frequency F is increased and the dosing time t is reduced. This can, for example, be achieved in that the dosing frequency F is doubled and the dosing time t is halved. This example is illustrated in FIG. 2, which shows two graphs. The upper graph shows a number of pulse-wise dosing of reducing agent with dosing time t, which is thus the time during which the regulating element is open and reducing agent is being injected into the exhaust gas flow. The dosing period time in this case is L, which means that the dosing frequency F=1/L. The lower graph illustrates an embodiment of the invention in which the dosing frequency F is doubled and the dosing time t is halved. This means that the same amount of reducing agent is released over the same time period.

The content of reducing agent for the two situations has also been specified in the upper graph and the lower graph in FIG. 2. These contents are designated as R1 and R2.

In the upper graph in FIG. 2, in which the dosing frequency is F, injection of a relatively large amount of reducing agent simultaneously entails that not all of it will have time to be consumed in the SCR catalytic converter, but rather a portion will be entrained on with the exhaust gases to the ASC catalyst, where the remaining ammonia will, under certain conditions, be oxidized into $NO_X$ while, under different conditions, for example at low exhaust gas flow temperatures, it will instead be released as $N_2O$.

In the lower graph in FIG. 2, the dosing frequency F has been doubled and the dosing time halved, i.e. the same amount of reducing agent is released over the same time period. In this case a smaller amount of ammonia will, under certain conditions, be entrained on to the ASC catalyst because a greater share of the reducing agent will have time to be consumed in the SCR catalytic converter, and the release of $N_2O$ will be lower than in the case that is illustrated in the upper graph.

FIG. 2 clearly illustrates the advantages of the present invention as a result of the equalization of the reducing agent contents that the curve R2 shows compared to the curve R1. This is evident in that the variations for the curve R2 are less than for the curve R1.

According to one embodiment the dosing frequency is at least 2 Hz.

According to an additional embodiment, the exhaust gas aftertreatment system comprises a temperature sensor 18 that is configured to measure the temperature in the exhaust gas flow upstream of the SCR catalytic converter 6 and/or ASC catalyst 4. The read temperature T is transmitted to the control unit 14. In the control unit 14 the read temperature is compared to a predetermined threshold value $T_{TH}$, and if the read temperature T is higher than $T_{TH}$, the dosing frequency is adjusted so that it is increased. The increase in the dosing frequency can, for example, entail a doubling of the frequency compared with when the temperature was below said threshold value $T_{TH}$. The predetermined threshold value $T_{TH}$ lies, for example, in the range of 300-450° C.

One alternative to arranging a temperature sensor as described above is to instead measure a temperature related to the temperature in the exhaust gas flow and calculate the temperature of the exhaust gas flow based on known relationships between the measured temperature and the temperature in the exhaust gas flow. According to an additional alternative, a calculation model is instead used to determine the temperature in the exhaust gas flow, where the model utilizes a number of other known parameters in order to determine the temperature. The temperature T that is measured, or determined according to the alternatives specified above, is transmitted to the control unit 14, wherein the comparison described above is performed.

According to another embodiment, the dosing frequency F is instead adjusted continuously in dependence upon the temperature of the exhaust gas flow upstream of the SCR catalytic converter and/or ASC catalyst in such a way that an increased temperature results in an increased frequency. Correlated values for temperature and dosing frequency, and naturally other parameters related to the release of the reducing agent, are stored in, for example, a table in the control unit 14.

The present invention also comprises a method for an exhaust gas aftertreatment system configured to reduce the amount of $N_2O$ that is produced in a selective catalytic reduction catalytic converter (SCR catalytic converter) and/or in an ammonia slip catalyst (ASC catalyst) disposed in the exhaust gas flow from a combustion engine, wherein the ASC catalyst is intended to oxidize ammonia in the exhaust gas flow. The exhaust gas aftertreatment system comprises an SCR catalytic converter disposed upstream of an optional ASC catalyst. A reducing agent is adapted so as to be added to the exhaust gas flow upstream of the SCR catalytic converter at a dosing frequency F. The system has been described in greater detail above with reference to FIG. 1, and reference is made here to that description.

The method comprises adjusting the dosing frequency F so that the amount of $N_2O$ that is produced in the SCR catalytic converter and/or ASC catalyst is minimized while maintaining the amount of reducing agent added.

According to one embodiment of the method, the dosing frequency is adjusted so that the variation in the amount/content of reducing agent upstream of the SCR catalytic converter and/or ASC catalyst is lower than a predetermined threshold value $\Delta R$, where $\Delta R$ is +/−5%.

For example, the dosing frequency F is adjusted so that the variation in the amount/content of reducing agent upstream of the SCR catalytic converter is lower than a predetermined threshold value $\Delta R$, where $\Delta R$ is +/−1%.

According to an additional example, the dosing frequency F is adjusted so that the variation in the amount/content of reducing agent upstream of the ASC catalyst is lower than a predetermined threshold value $\Delta R$, where $\Delta R$ is +/−5%.

The adjustment of the dosing frequency F preferably entails that the dosing frequency F is increased and the dosing time t is reduced. This can be achieved, for example, in that the dosing frequency F is doubled and the dosing time t is halved.

Figure 3:
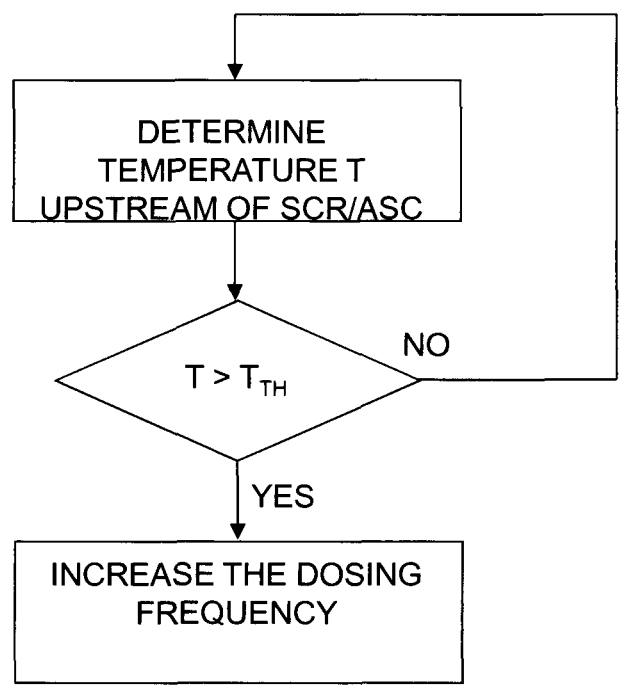
FIG. 3 is a flow diagram that illustrates the method according to one embodiment of the present invention.

According to yet another embodiment, the method comprises measuring the temperature in the exhaust gas flow upstream of the SCR catalytic converter and/or ASC catalyst. The read temperature T is transmitted to the control unit. In the control unit the read temperature is compared to a predetermined threshold value $T_{TH}$ and, if the read temperature T is higher than $T_{TH}$, the dosing frequency F is adjusted so that it is increased. This embodiment is illustrated schematically by the flow diagram in FIG. 3. Reference is also made here to the alternative means of determining the temperature that were discussed above.

The increase in the dosing frequency F can, for example, entail a doubling of the dosing frequency compared with when the temperature was below said threshold value $T_{TH}$. The predetermined threshold value $T_{TH}$ lies, for example in the range of 300-450° C.

According to another embodiment, the dosing frequency F is instead adjusted continuously in dependence upon the exhaust gas flow temperature upstream of the SCR catalytic converter and/or ASC catalyst in such a way that an increased temperature results in an increased dosing frequency. Correlated values for temperature and dosing frequency and, naturally, other parameters related to the release of the reducing agent are stored, for example, in a table in the control unit 14.

The present invention is not limited to the preferred embodiments described above. Various alternatives, modifications and equivalents can be used. The foregoing embodiments are consequently not to be to viewed as limiting the protective scope of the invention, which is defined in the accompanying claims.

The invention claimed is:

1. A method for operation of an exhaust gas aftertreatment system which is configured to reduce an amount of $N_2O$ that is produced in a selective catalytic reduction catalytic converter (SCR catalytic converter) and/or in an ammonia slip catalyst (ASC catalyst) disposed in the exhaust gas flow from a combustion engine,
wherein
the exhaust gas aftertreatment system comprises the SCR catalytic converter, if present, which is disposed upstream of the ASC catalyst, if present;
the method comprising:
adding a reducing agent to the exhaust gas flow upstream of the SCR catalytic converter at a dosing frequency F, selected or adjusted for minimizing the amount of $N_2O$ that is produced in the SCR and/or the ASC catalyst while maintaining a selected amount of the reducing agent added.

2. The method according to claim 1, further comprising adjusting the dosing frequency so that a variation in the amount of the reducing agent upstream of the SCR catalytic converter is lower than a predetermined threshold value ΔR of +/−5%.

3. The method according to claim 1, further comprising adjusting the dosing frequency so that a variation in the amount of the reducing agent upstream of the SCR catalytic converter is lower than a predetermined threshold value ΔR of +/−1%.

4. The method according to claim 2, further comprising: adjusting the dosing frequency so that the amount of the reducing agent upstream of the ASC catalyst is lower than a predetermined threshold value ΔR by +/−5%.

5. The method according to claim 1, further comprising: adjusting of the dosing frequency by increasing the dosing frequency F while reducing a dosing time t.

6. The method according to claim 5, wherein the increasing of the dosing frequency F entails a doubling of the dosing frequency and a halving of the dosing time t.

7. The method according to claim 5, further comprising adjusting the dosing frequency to be increased when the exhaust gas flow temperature upstream of the SCR and/or the ASC catalyst is higher than a predetermined threshold value.

8. The method according to claim 7, wherein increasing the dosing frequency entails a doubling of the dosing frequency compared with when the temperature was below the threshold value.

9. The method according to claim 7, wherein the predetermined threshold value lies in the range of 300-450° C.

10. The method according to claim 7, further comprising adjusting the dosing frequency continuously dependent upon the exhaust gas flow temperature upstream of the SCR catalytic converter and/or ASC catalyst such that an increased temperature causes an increased dosing frequency.

11. The method according to claim 1, wherein the dosing frequency is equal to or higher than 2 Hz.

12. An exhaust gas aftertreatment system configured to reduce an amount of $N_2O$ in an exhaust flow from a combustion engine, the system comprising:
a selective catalytic reduction catalytic converter (SCR catalytic converter) and/or an ammonia slip catalyst (ASC catalyst) disposed in the exhaust gas flow from a combustion engine, wherein the SCR catalytic converter, if present, is arranged in the exhaust gas line upstream of the ASC catalyst, if present, such that the exhaust gases from the combustion engine pass through the SCR catalytic converter and/or the ASC catalyst before the gases are released into surroundings via an exhaust gas outlet;
the system further comprising an injection device configured to inject a reducing agent into the exhaust gas upstream of the SCR catalytic converter at a selected dosing frequency F, and a control unit configured to generate a control signal adjusting a dosing frequency F of the reducing agent selected so that the amount of $N_2O$ that is produced in the SCR catalytic converter and/or the ASC catalyst is minimized, while maintaining the amount of reducing agent added.

13. The exhaust gas aftertreatment system according to claim 12, wherein the control unit is configured to adjust the dosing frequency so that the variation in the amount of reducing agent upstream of the SCR catalytic converter is lower than a predetermined threshold value ΔR by +/−5%.

14. The exhaust gas aftertreatment system according to claim 12, wherein the control unit is configured to adjust the dosing frequency so that the variation in the amount of reducing agent upstream of the SCR catalytic converter is lower than a predetermined threshold value ΔR by +/−1%.

15. The exhaust gas aftertreatment system according to claim 12, wherein the control unit is configured to adjust the dosing frequency so that the variation in the amount of reducing agent upstream of the ASC catalyst is lower than a predetermined threshold value ΔR by +/−5%.

16. The exhaust gas aftertreatment system according to claim 12, wherein the control unit is configured to adjust the dosing frequency F to be increased while a dosing time t is reduced.

17. The exhaust gas aftertreatment system according to claim 16, wherein the increase in the dosing frequency F comprises a doubling of the dosing frequency F and a halving of the dosing time t.

18. The exhaust gas aftertreatment system according to claim 12, further comprising a temperature sensor located and configured to measure the temperature in the exhaust gas flow upstream of the SCR catalytic converter and/or the ASC catalyst; and the control unit is configured to adjust the dosing frequency to increase when the exhaust gas flow temperature upstream of the SCR and/or the ASC catalyst is higher than a predetermined threshold value.

19. The exhaust gas aftertreatment system according to claim 18, wherein the increase in the dosing frequency comprises doubling the dosing frequency compared with the dosing frequency when the temperature is below the threshold value.

20. The exhaust gas aftertreatment system according to claim 18, wherein the predetermined threshold value is in the range of 300-450° C.

21. The exhaust gas aftertreatment system according to claim 18, wherein the control unit is configured to continuously adjust the dosing frequency in dependence upon the exhaust gas flow temperature upstream of the SCR catalytic converter and/or the ASC catalyst such that an increased temperature in the gas flow results in an increased dosing frequency.

22. The exhaust gas aftertreatment system according to claim 12, wherein the dosing frequency is equal to or higher than 2 Hz.

* * * * *